United States Patent
Graham

[11] Patent Number: 6,041,914
[45] Date of Patent: Mar. 28, 2000

[54] VIBRATORY BOWL FOR FRAGILE PARTS

[76] Inventor: S. Neal Graham, 12997 Fawns Ridge, Fishers, Ind. 46038

[21] Appl. No.: 08/910,633

[22] Filed: Aug. 13, 1997

[51] Int. Cl.[7] .................................................. B65G 27/02
[52] U.S. Cl. ........................................... 198/757; 198/391
[58] Field of Search ..................................... 198/391, 756, 198/757

[56] References Cited

U.S. PATENT DOCUMENTS

| | | |
|---|---|---|
| 2,718,957 | 9/1955 | Spurlin . |
| 2,867,313 | 1/1959 | Deshaw et al. . |
| 2,964,182 | 12/1960 | Spurlin . |
| 3,114,448 | 12/1963 | Boris ...................................... 198/391 |
| 3,147,841 | 9/1964 | Austin . |
| 3,150,762 | 9/1964 | Tricinci . |
| 3,208,580 | 9/1965 | Baruch . |
| 3,258,106 | 6/1966 | Booth . |
| 3,295,661 | 1/1967 | Mitchell, Jr. et al. . |
| 3,508,639 | 4/1970 | Braden ................................ 198/757 X |
| 3,530,974 | 9/1970 | Moore . |
| 3,578,142 | 5/1971 | Burgess, Jr. . |
| 3,907,099 | 9/1975 | Smith . |
| 4,206,539 | 6/1980 | Weresch . |
| 4,236,302 | 12/1980 | Kuehling . |
| 4,245,733 | 1/1981 | Kubota et al. . |
| 4,348,806 | 9/1982 | Eves et al. . |
| 4,440,286 | 4/1984 | Saxon . |
| 4,453,626 | 6/1984 | Roberts et al. . |
| 4,739,873 | 4/1988 | Yajima . |
| 5,083,654 | 1/1992 | Nakajima et al. . |
| 5,114,039 | 5/1992 | Walshe et al. . |
| 5,191,960 | 3/1993 | Wareham . |
| 5,335,779 | 8/1994 | Negrete . |
| 5,472,079 | 12/1995 | Yagi et al. . |
| 5,630,497 | 5/1997 | Graham ................................... 198/391 |

FOREIGN PATENT DOCUMENTS 0397527   2/1966   Switzerland ........................... 198/757

Primary Examiner—James R. Bidwell
Attorney, Agent, or Firm—Woodard, Emhardt, Naughton, Moriarty & McNett Patent and Trademark Attorneys

[57] ABSTRACT

A vibratory bowl for fragile parts is externally dimensioned to a standard height for a particular type of fragile parts to be oriented. The vibratory bowl is configured to reduce, if not eliminate, impact damage as well as wear and tear on fragile parts. The vibratory bowl includes a base and an annular wall having a helical parts track coupled to the base. The helical parts track extends along an inner surface of the annular wall from the base to a parts discharge port of the annular wall. In a preferred embodiment, the helical parts track makes approximately one and a quarter turns or less along the inner surface of the annular wall, and the height of the base is equal to or greater than the height of the annular wall.

15 Claims, 4 Drawing Sheets

VIBRATORY BOWL FOR FRAGILE PARTS

FIELD OF THE INVENTION

The present invention generally relates to the field of article feed mechanisms and sorters, and more particularly to vibratory parts feeders having a vibratory bowl internally configured to orient fragile parts.

BACKGROUND OF THE INVENTION

Vibratory parts feeders are commonly known apparata for orienting parts from a mass of disoriented parts so that the parts may be compiled in an orderly manner or transported along a processing path. In orienting the parts, a vibratory parts feeder typically includes a vibratory bowl which is driven by a vibratory drive unit. A conventional vibratory bowl is internally configured to convey the parts along a helical parts track under vibratory action to a bowl exit location near the top edge of the bowl. The conventional vibratory bowl is also externally dimensioned to a standard height for a particular type of parts to be oriented. This ensures the parts will be properly compiled or transported.

A common problem associated with conventional vibratory bowls is the inability to orient fragile parts without causing some form of structural or functional damage to the fragile parts. Specifically, the bottom of a conventional vibratory bowl is substantially the same as the standard height of the bowl, and a user of a conventional vibratory bowl will fully load the bowl with fragile parts. As the fragile parts convey along the helical parts track, any disoriented fragile part will fall from the helical parts track toward the bottom of the bowl in order to be reconveyed in the proper orientation along the helical parts track. For any fragile part that falls from the helical parts track, damage to the fragile part may occur in three ways. First, impact with another fragile part near the bottom of the bowl may cause a portion of the fallen part as well as a portion of the other fragile part to deform, fracture, split, etc. Second, impact with the bottom of the bowl may also cause a portion of the fragile part to deform, fracture, split, etc. Finally, for a given fragile part that repeatedly falls from the helical parts track, the continual conveyance of such a fragile part may eventually cause wear and tear.

What is therefore needed is a novel vibratory bowl of standard height for a particular part that is internally configured to significantly lessen, if not entirely eliminate, the risk of damage to the fragile parts within the bowl.

SUMMARY OF THE INVENTION

The present invention overcomes the drawbacks of the conventional vibratory bowls described in the BACKGROUND section. In accordance with a first aspect of the present invention, a vibratory bowl having a standard height for a particular type of parts comprises a base, and an annular wall having a parts discharge port and a helical parts track coupled to the base, wherein the helical parts track upwardly extends along an inner surface of the annular wall from the base to the parts discharge port in approximately one and a quarter turns or less. In a second aspect of the present invention, a vibratory bowl having a standard height for a particular type of parts comprises a base, and an annular wall having a parts discharge port and a helical parts track coupled to the base, wherein the height of the base is equal to or greater than the height of the annular wall.

An object of the present invention is to provide a vibratory bowl internally configured with the least amount of helical parts track that is necessary to efficiently orient fragile parts while reducing the risk of damage to the fragile parts, and externally dimensioned to a standard height for the particular type of parts being oriented.

Another object of the present invention is to provide a vibratory bowl internally configured with a minimal distance between a base of the vibratory bowl and a discharge port of the vibratory bowl that is necessary to efficiently orient fragile parts while reducing the risk of damage to the fragile parts, and externally dimensioned to a standard height for the particular type of parts being oriented.

These and other objects of the present invention will become more apparent from the following description of the preferred embodiment of the present invention.

DESCRIPTION OF THE PREFERRED EMBODIMENT

Figure 1:
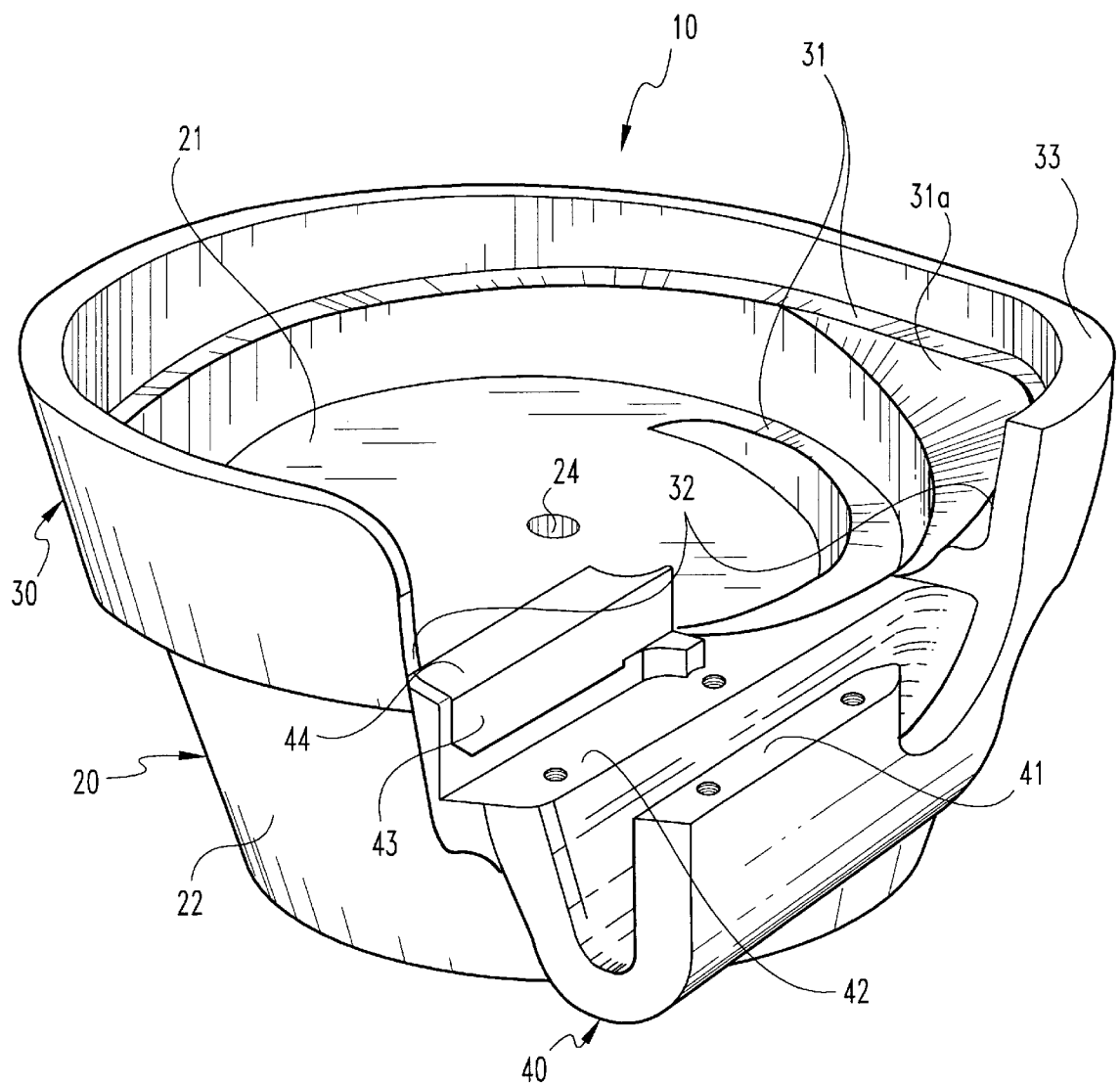
FIG. 1 is a front perspective view of a vibratory bowl in accordance with a preferred embodiment of the present invention.

For the purposes of promoting an understanding of the principles of the present invention, reference will now be made to the preferred embodiment illustrated in the drawings and specific language will be used to describe the same. It will nevertheless be understood that no limitation of the scope of the present invention is thereby intended, such alterations and further modifications in the illustrated embodiment, and such further applications of the principles of the present invention as illustrated therein being contemplated as would normally occur to one skilled in the art to which the present invention relates.

For purposes of the present invention, the term fragile parts encompasses any mechanical or electrical part that includes at least one portion that is susceptible to structural or functional damage due to any degree of impact with another object. The term fragile parts also encompasses any mechanical or electrical part that is susceptible to wear and tear from continual applications of a vibratory force to the fragile part.

Figure 2:
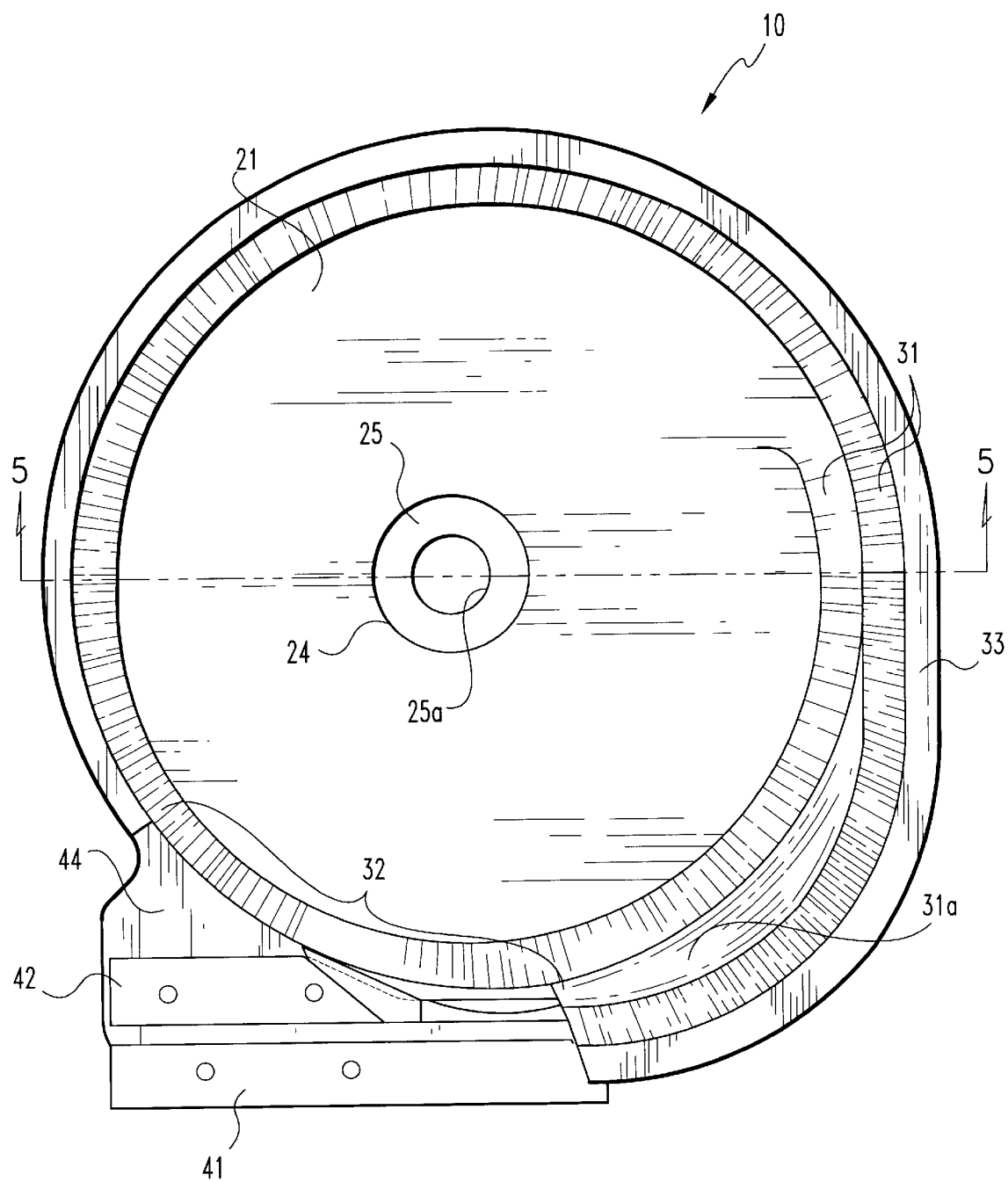
FIG. 2 is a top plan view of the preferred embodiment shown in FIG. 1.

Referring to FIGS. 1 and 2, a vibratory bowl 10, in accordance with the first and second aspects of the present invention, includes a base 20, an annular wall 30 and a parts orientation member 40. In the preferred embodiment, vibratory bowl 10 is a Polycast™ bowl, although the present invention contemplates that vibratory bowl 10 may be constructed from other suitable materials such as, for example, stainless steel.

Base 20 is a geometric body that has a top surface 21, a side surface 22 and a bottom surface 23 (not shown). In a preferred embodiment, base 20 is a solid cylinder, although the present invention contemplates that base 20 can be hollow and can be in any geometric form. Also in the preferred embodiment, top surface 21 gradually slopes upward 15 degrees from a periphery of top surface 21 to an axial point of top surface 21, although the present invention contemplates that upper surface 21 is conical to some degree in order to urge fragile parts (not shown) located on top surface 21 to the periphery of top surface 21. The present invention further contemplates that base 20 may include a hole 24 extending through base 20, and a plate 25 having a hole 25a coupled to bottom surface 23. As will be described later herein, hole 24 and plate 25 are utilized to couple base 20 to a vibratory drive unit (not shown).

Still referring to FIGS. 1 and 2, annular wall 30 includes a helical parts track 31 and a parts discharge port 32. Helical parts track 31 is coupled to top surface 21 and extends upwardly along an inner surface of annular wall 30 to parts discharge port 32. Annular wall 30 further has an upper rim 33 which is positioned sufficiently above helical parts track 31 to keep fragile parts (not shown) from being ejected from vibratory bowl 10 during vibrating operations. In the preferred embodiment, helical parts track 31 is integral with top surface 21 as shown in FIG. 1, although the present invention contemplates that helical parts track 31 can be coupled to top surface 21 by any coupling method. Also in the preferred embodiment, helical parts track 31 has a sloped portion 31 a located near parts discharge port 32 so that certain disoriented fragile parts (not shown) on helical parts track 31, such as fragile parts that are side-by-side or a fragile part that is sideways, will slide back onto top surface 21. However, the present invention does contemplate that annular wall 30 may include a separate component for forcing disoriented parts back onto top surface 21.

Still referring to FIGS. 1 and 2, parts orientation member 40 is coupled to annular wall 30 near parts discharge port 32 in order to receive fragile parts (not shown) from helical parts track 31. In a preferred embodiment parts orientation member 40 is integral with annular wall 30 as shown in FIG. 1, although the present invention contemplates that parts orientation member 40 may be coupled to annular wall 30 by any coupling method. Also in a preferred embodiment, parts orientation member 40 has a first surface 41, a second surface 42, a third surface 43 and a fourth surface 44 that may be utilized to attach a parts orientation unit (not shown) to vibratory bowl 10, such as the parts orientation units described in U.S. Pat. No. 5,630,497 and U.S. Pat. No. 5,960,926, both herein incorporated by reference. However, the present invention contemplates that parts orientation member 40 may be configured to attach any type of parts orientation unit to vibratory bowl 10.

The important aspects of vibratory bowl 10 will now be described herein. First, in order to reduce the amount time most fragile parts are conveyed on helical parts track 31, the present invention contemplates that helical parts track 31 is configured to make approximately one and a quarter turns from top surface 21 along the inner surface of annular wall 30 to parts discharge port 32. For extremely fragile parts, the present invention contemplates that helical parts track 31 can be configured to make less than one and a quarter turns from top surface 21 along the inner surface of annular wall 30 to parts discharge port 32. Second, vibratory bowl 10 is externally dimensioned to various standard heights depending upon the particular type of parts. As shown in FIGS. 1 and 2, the height of vibratory bowl 10 consists of a height of side surface 22 and the height of the annular wall 30. In order to reduce the distance between top surface 21 and parts discharge port 32 for most fragile parts, the present invention contemplates vibratory bowl 10 is externally dimensioned to the standard height with the height of side surface 22 being equal to the height of the annular wall 30. For extremely fragile parts, the present invention contemplates that vibratory bowl 10 is externally dimensioned to the standard height with the height of side surface 22 being greater than the height of annular wall 30 as shown in FIG. 1.

It is to be appreciated and understood that that a fragile part that falls off helical parts track 31 toward top surface 21, e.g. a disoriented fragile part sliding off portion 31a of helical parts track 31, will have a significantly shorter distance to fall onto top surface 21 and/or another fragile part located on top surface 21 than otherwise in a conventional vibratory bowl. Consequently, the risk of damage to the fragile part from an impact with another fragile part and/or top surface 21 is reduced, if not eliminated. It is to be further appreciated and understood that fragile parts spend less time within vibratory bowl 10 and fall off of helical parts track 31 fewer times than would otherwise in a conventional vibratory bowl. Thus, the fragile part will spend less time being vibrated, and the risk of wear and tear will be reduced, if not eliminated.

Figure 3:
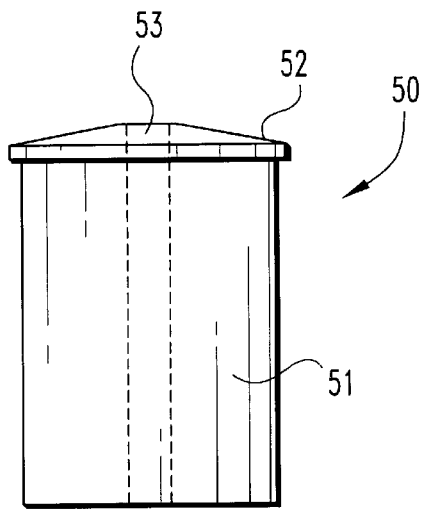
FIG. 3 is a side view of a flange in accordance with the preferred embodiment of the present invention.
Figure 4:
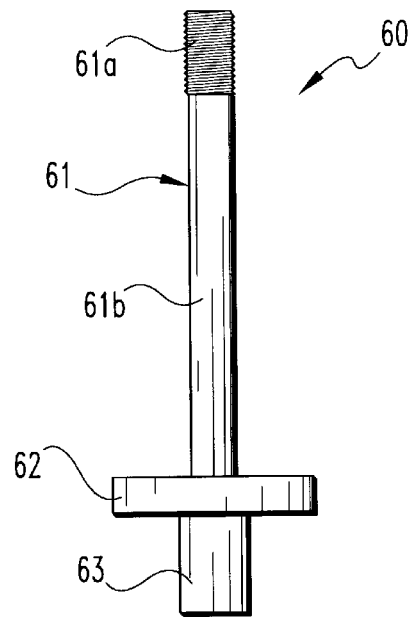
FIG. 4 is a side view of a stud in accordance with the preferred embodiment of the present invention.

The preferred method of coupling base 10 to a vibratory drive unit will now be described herein. FIGS. 3 and 4 respectively illustrate a washer 50 and a stud 60. Referring to FIG. 3, washer 50 includes a cylindrical member 51, a flange 52 coupled to cylindrical member 51 and a hole 53 extending throughout cylindrical member 51 and flange 52. Referring to FIG. 4, stud 60 includes a rod 61 having threads 61a and an unthreaded portion 61b, a flange 62 coupled to unthreaded portion 61b, and a clamping member 63 coupled to flange 62.

Figure 5:
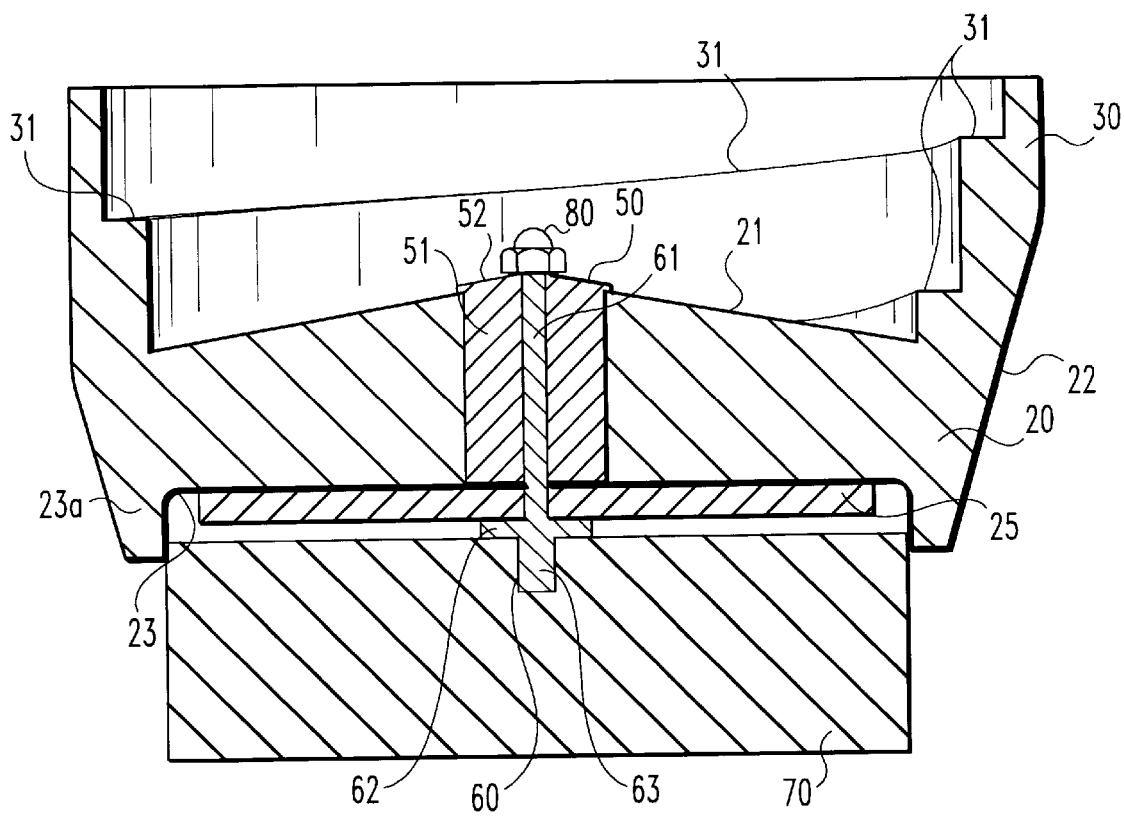
FIG. 5 is a cross-sectional view of FIG. 2 along lines 5—5 coupled to a vibratory drive unit.

FIG. 5 illustrates a coupling of base 20 of vibratory bowl 10 to a vibratory drive unit 70 via washer 50 and stud 60. Referring to FIG. 5, in a preferred embodiment, bottom surface 23 is concave with a flange 23a, although the present invention contemplates that bottom surface 23 can have any shape. Cylindrical body 51 completely fits within hole 24 with flange 52 in contact with top surface 21. Unthreaded portion rod 61b completely fits within hole 25a and hole 53, threads 61a extend upwardly from flange 52, and flange 62 is in contact with plate 25. A nut 80 is screwed on threads 61a to secure washer 50 and stud 60 to base 20. Clamping body 63 is coupled to vibratory drive unit 70.

While the present invention has been illustrated and described in detail in the drawings and foregoing description, the same is to be considered as illustrative and not restrictive in character, it being understood that the preferred embodiment has been shown and described and that all changes and modifications that come within the spirit of the present invention are desired to be protected.

What is claimed is:

1. A vibratory bowl for fragile parts comprising:
   a base having a top surface and a bottom surface, said base further having a hole extending from said top surface to said bottom surface;
   a washer disposed within said hole; and
   an annular wall having a parts discharge port and a helical parts track coupled to said base, said helical parts track extending along an inner surface of said annular wall from said base to said parts discharge port,
   wherein said helical parts track makes less than about one and a quarter turns along said inner surface.

2. The vibratory bowl of claim 1 wherein said helical parts track is integrated with said base.

3. The vibratory bowl of claim 1 further comprising a parts orientation member coupled to said annular wall near said parts discharge port.

4. The vibratory bowl of claim 3 wherein said parts orientation member is integrated into said annular wall.

5. The vibratory bowl of claim 1 further comprising means for coupling said base to a vibratory drive unit.

6. A vibratory bowl for fragile parts comprising:

a base having a first external surface; and an annular wall having a second external surface and an internal surface, said annular wall including a parts discharge port and a helical parts track coupled to said base, said helical parts track extending along said inner surface of said annular wall from said base to said parts discharge port, wherein a height of said first external surface is equal to or greater than a height of said second external surface.

7. The vibratory bowl of claim 6 wherein said helical parts track is integrated with said base.

8. The vibratory bowl of claim 6 further comprising a parts orientation member coupled to said annular wall near said parts discharge port.

9. The vibratory bowl of claim 8 wherein said parts orientation member is integrated with said annular wall.

10. The vibratory bowl of claim 6 further comprising means for coupling said base to a vibratory drive unit.

11. A vibratory bowl for fragile parts comprising:

a base having a first external surface; and an annular wall having a second external surface and an internal surface, said annular wall including a parts discharge port and a helical parts track coupled to said base, said helical parts track extending along an inner surface of said annular wall from said base to said parts discharge port, wherein a height of said first external surface is equal to or greater than a height of said said second external surface, and wherein said helical parts track makes less than about one and a quarter turns along said inner surface.

12. The vibratory bowl of claim 11 wherein said helical parts track is integrated with said base.

13. The vibratory bowl of claim 11 further comprising a parts orientation member coupled to said annular wall near said parts discharge port.

14. The vibratory bowl of claim 13 wherein said parts orientation member is integrated with said annular wall.

15. The vibratory bowl of claim 11 further comprising means for coupling said base to a vibratory drive unit.

* * * * *